(12) United States Patent
LeFever et al.

(10) Patent No.: US 7,667,649 B2
(45) Date of Patent: Feb. 23, 2010

(54) DETECTION OF TIME OF ARRIVAL OF CDMA SIGNALS IN A WIRELESS LOCATION SYSTEM

(75) Inventors: Ronald LeFever, Lansdale, PA (US); Rashidus S. Mia, Phoenixville, PA (US); Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 220 days.

(21) Appl. No.: 11/953,585

(22) Filed: Dec. 10, 2007

(65) Prior Publication Data

US 2009/0149132 A1    Jun. 11, 2009

(51) Int. Cl.
*G01S 3/02* (2006.01)
(52) U.S. Cl. .................................... 342/465; 342/387
(58) Field of Classification Search ............... 342/465, 342/387, 451, 463–464
See application file for complete search history.

(56) References Cited

U.S. PATENT DOCUMENTS

| | | | |
|---|---|---|---|
| 5,327,144 A | 7/1994 | Stilp | 342/387 |
| 5,608,410 A | 3/1997 | Stilp et al. | |
| 5,874,916 A | 2/1999 | Desjardins | |
| 6,108,555 A | 8/2000 | Maloney | 455/456 |
| 6,184,829 B1 | 2/2001 | Stilp | 342/387 |
| 6,266,013 B1 | 7/2001 | Stilp | 342/387 |
| 6,760,387 B2 | 7/2004 | Langford et al. | |
| 6,782,264 B2 | 8/2004 | Anderson | 455/456 |
| 6,876,859 B2 | 4/2005 | Anderson | 455/456 |
| 2006/0003775 A1 | 1/2006 | Bull | 455/456.1 |
| 2008/0032709 A1* | 2/2008 | Guvenc et al. | 455/456.2 |

OTHER PUBLICATIONS

Price et al., "Communication Technique for Multipath Channels," Proc. IRE, 1958, 46, 555-570.
3GPP technical specifications 25.201, "Physical layer on the radio path; General description," downloaded 2008, 3 pages.
3GPP technical specifications 25.213, "Spreading and modulation (FDD)," downloaded 2008, 3 pages.
3GPP technical specification 25.211, "Physical channels and mapping of transport channels onto physical channels (FDD)," downloaded 2008, 4 pages.
3GPP technical specification 25.430, "UTRAN Iub Interface: general aspects and principles," downloaded 2008, 3 pages.
3GPP technical specification 25.420, "UTRAN Iur Interface: General Aspects and Principles," downloaded 2008, 3 pages.
3GPP techncial specification 25.450, "UTRAN Iupc interface general aspects and principles,"downloaded 2008, 2 pages.

(Continued)

*Primary Examiner*—Thomas H Tarcza
*Assistant Examiner*—Fred H Mull
(74) *Attorney, Agent, or Firm*—Woodcock Washburn LLP

(57) ABSTRACT

In a Wireless Location System (WLS) deployed in connection with a CDMA-based wireless communications system, Location Measurement Units are used to collect multi-path corrupted radio signaling for use in time difference of arrival (TDOA) and hybrid positioning methods. Signal processing techniques are used to enhance the WLS's ability to determine the minimally time-delayed multi-path component and thus increase the accuracy of the TDOA location in CDMA-based wireless communications systems. The signal processing includes a filtering technique for reducing the leading sidelobes of the cross-correlation function as well as a leading edge discovery procedure.

46 Claims, 10 Drawing Sheets

OTHER PUBLICATIONS

"IP Based Location Services," 3GGP2, 2003, 1-20.

"TIA/EIA-41-D Location Services Enhancements," 3GPP2, 2004, 1-234.

"Wireless Intelligent Network Support for Location Based Services," 3GPP2, 2004, 1-151.

"Position Determination Service for cdma2000 Spread Spectrum Systems," 3GPP2, 2004, 1-298.

* cited by examiner

DETECTION OF TIME OF ARRIVAL OF CDMA SIGNALS IN A WIRELESS LOCATION SYSTEM

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to a method for improving the detection of the first arriving radio signal in a wireless communications system using Code Division Multiple Access (CDMA) spread spectrum radio technology.

BACKGROUND

Code Division Multiple Access (CDMA) is a now common method for transmission of voice and data over radio. TruePosition was a pioneer in location of CDMA mobiles when in the year 2000, it conducted extensive testing with Verizon Wireless in mid-town Manhattan, N.Y. Verizon Laboratories used the rigorous test plan published by the CDMA Development Group (CDG) to determine the performance of TruePosition's network-based location technology in the challenging urban canyon (10 to 25 story buildings) environment. The WLS demonstrated sub-100 meter location results in a variety of indoor, outdoor, pedestrian, and moving vehicle scenarios. In the trial, unmodified CDMA (IS-95) mobile phones were used to make more than 30,000 test calls. These calls were placed by both Verizon Labs (formerly GTE Labs) and TruePosition in an area covered by 30 cell sites hosting time difference of arrival (TDOA) receivers.

The present invention derives in part from the data collected during the 2000 trial and is a distinct improvement over the trial system in terms of location performance. The disclosed techniques are also useful in a hybrid solution where assisted GPS (A-GPS) and Uplink Time Difference of Arrival (U-TDOA) technologies operate independently and simultaneously to obtain range estimates that can be combined in a final TDOA calculation or operate in fallback mode where U-TDOA is used when A-GPS fails. Use of a hybrid wireless location system, using the inventive concepts, creates an improved location solution with enhanced accuracy, yield, and performance.

The inventive techniques and concepts described herein apply to code-division radio communications systems, including the technologies referred to in technical specifications as CDMAOne (TIA/EIA IS-95 CDMA with IS-95A and IS-95B revisions), CDMA2000 family of radio protocols (as defined by the 3rd Generation Partnership Project 2 (3GPP2)), and in the Wideband Code-Division Multiple-Access (W-CDMA) radio system defined by the 3rd Generation Partnership Project (3GPP) as part of the Universal Mobile Telephone System (UMTS). The UMTS model discussed herein is an exemplary but not exclusive environment in which the present invention may be used.

The needs of a CDMA-based wireless communications system and a wireless location system (WLS) differ. In a CDMA-based communications system, due to the multi-path radio environment, multiple time delayed, frequency offset copies of the transmitted signal arrive at the receiver antenna. Due to the design of the CDMA codes and receiver, these delayed waveforms can be recovered and combined to yield an improved signal since the direct wave is not necessarily the best signal.

Using CDMA, both the base station and mobile receivers use rake receiver techniques first devised by Price and Green in 1958. (See Price, R.; Green, P. Jr.; "*A Communication Technique for Multipath Channels*," Proc. IRE, vol. 46, pp. 555-570, March 1958.) Each correlator in a rake receiver is called a "finger". The outputs of rake-receiver fingers may be combined coherently or non-coherently. Typical CDMA receivers use 3 to 5 fingers. There are two primary real-time methods used to combine the rake-receiver finger outputs and thus boost the signal gain. These signal amplification techniques are equal-gain combining or maximal-ratio combining. These signal amplification techniques are useful for wireless communications, but since the timing of the CDMA signal is perturbed by the combinational techniques, they are less useful for TDOA-based wireless location.

A WLS may use the well-known basic CDMA rake receiver design, but due to the non-real time constraints of a WLS versus a voice/data wireless communications system, other signal collection and signal processing techniques provide better processing gain than the standard bitwise equal-gain combining or maximal-ratio combining while preserving the minimally time delayed signal for determination of TDOA timing. As described herein, a combination of processing techniques may be used to determine the valid minimally time delayed signal in the presence of time-delayed, frequency offset multipath CDMA signals for the purpose of U-TDOA location.

SUMMARY

The following summary provides a high level overview of the inventive methods and systems described herein. This summary is by no means intended to cover all of the inventive subject matter described in greater detail below, nor is it intended to limit the scope of protection of the claims appearing at the end of this specification.

An illustrative embodiment of the invention provides a method for improving a TDOA estimate in a WLS. The TDOA estimate in such a system is produced by cross-correlating a local signal with a reference signal, using either a time-domain or frequency-domain cross-correlation process. As used herein, the term cross-correlation process is intended to encompass both the time-domain cross-correlation and the frequency domain cross-spectrum processes. In this exemplary embodiment, the local signal is a copy of a signal transmitted by a mobile transmitter as received at a first antenna and the reference signal is a copy of the signal transmitted by the mobile transmitter as received at a second antenna. The local signal is received at a first location measurement unit (LMU), and the local and reference signals are processed to produce a correlation function. The correlation function may be viewed as comprising a correlation-time-frequency map, which is then searched for a global maximum above a detection assurance threshold, and a valid global maximum correlation peak is identified. The correlation-time-frequency map is then reduced to a two-dimensional time-correlation timeslice centered on a frequency of the valid global maximum correlation peak. The two-dimensional time-correlation timeslice is then searched for a local maximum above the detection assurance threshold occurring earlier in time than the global maximum correlation peak. Finally, a leading edge discovery procedure is performed. The leading edge discovery procedure finds an earlier leading edge concealed within a correlation envelope of the two-dimensional time-correlation timeslice.

In addition, in a preferred embodiment, the aforementioned processing may include correlation processing and filtering of the local and reference signals to produce a correlation correlation-time-frequency function comprising leading sidelobes that are reduced in amplitude. This improves the system's sensitivity and ability to detect signal events that would otherwise be masked by multipath and/or other interfering signals.

Another aspect of a preferred embodiment relates to the leading edge discovery procedure. According to this aspect, the TDOA value reported to the WLS is the value calculated by a predefined time-of-arrival determination procedure performed after the leading edge discovery procedure successfully finds an earlier leading edge.

The present invention also encompasses a WLS comprising a network of location measurement units (LMUs) including at least a first LMU and a second LMU, wherein at least the first LMU includes a processor and a computer readable storage medium comprising instructions for configuring the processor to compute TDOA estimates in accordance with the prescribed method recited above.

Other aspects of the inventive methods and systems are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1A:
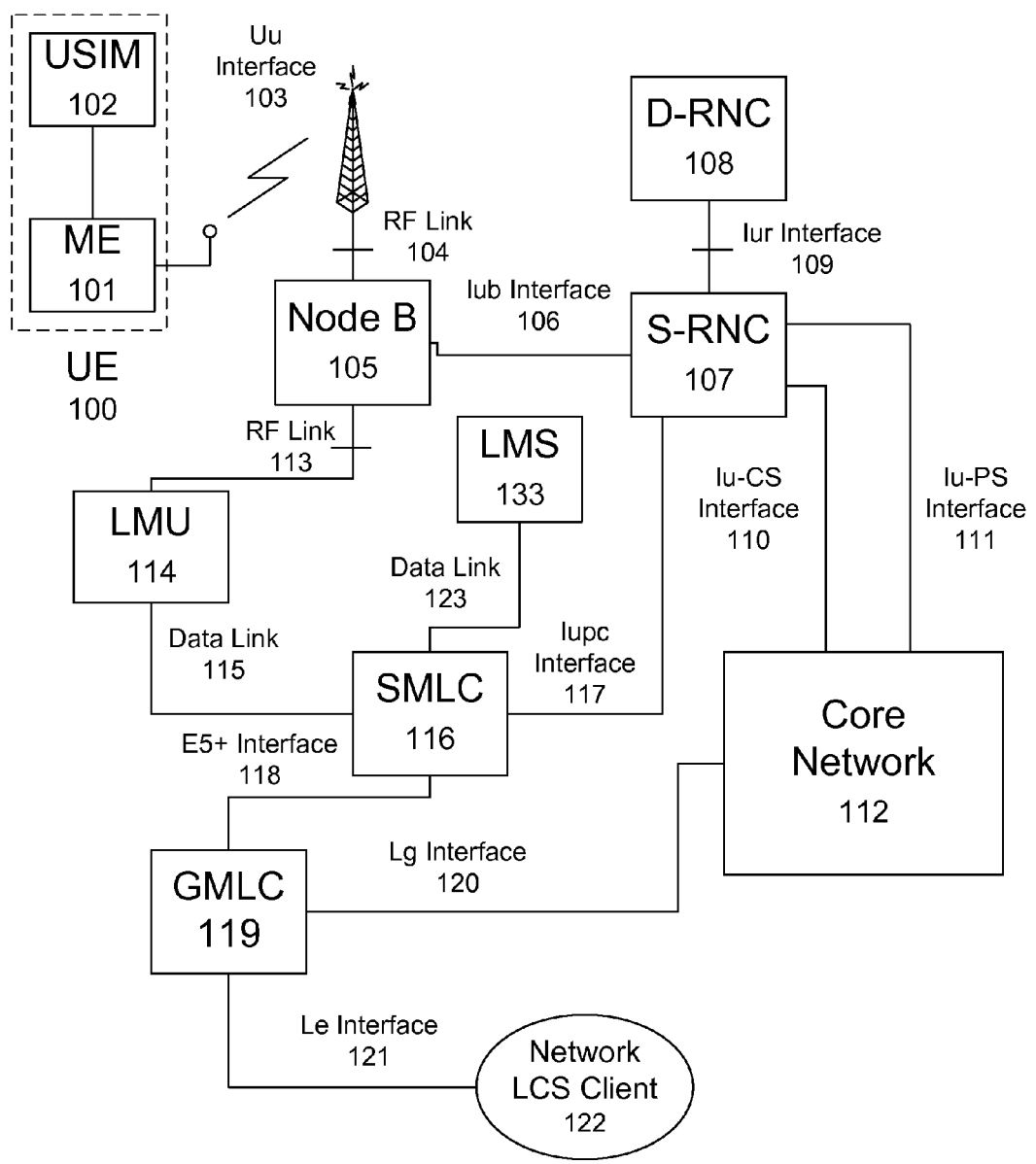
FIG. 1a schematically depicts a Wireless Location System for use with a UMTS based wireless communications system.

We will now describe illustrative embodiments of the present invention. First, we provide an overview and then a more detailed description, including a discussion of the problem addressed by the invention and the inventive solutions.

Overview

One embodiment of the invention provides a method for improving a TDOA estimate produced by cross-correlating a local signal with a reference signal, using either a time-domain or frequency-domain cross-correlation process. The local signal is a copy of a signal transmitted by a mobile transmitter as received at a first antenna and the reference signal is a copy of the signal transmitted by the mobile transmitter as received at a second antenna. The inventive method comprises receiving the local signal at a first location measurement unit (LMU) and processing the local and reference signals to produce a correlation function comprising a correlation-time-frequency map. The method then entails searching the correlation function for a global maximum above a detection assurance threshold, and identifying a valid global maximum correlation peak. Next, the correlation-time-frequency map is reduced to a two-dimensional time-correlation timeslice centered on a frequency of the valid global maximum correlation peak. The two-dimensional time-correlation timeslice is then searched for a local maximum above the detection assurance threshold occurring earlier in time than the global maximum correlation peak. Finally, a leading edge discovery procedure is performed. The leading edge discovery procedure aims to find an earlier leading edge concealed within a correlation envelope of the two-dimensional time-correlation timeslice.

As explained in greater detail below, in a preferred embodiment, the aforementioned processing of the local and reference signals to produce a correlation function comprising a correlation-time-frequency map processing may include correlation processing and filtering of the local and reference signals to produce a correlation correlation-time-frequency function comprising leading sidelobes that are reduced in amplitude. For example, in one exemplary embodiment, the filtering produces a reduction of at least eight Decibels (8 dB) in the amplitude of the leading sidelobes. For example, in the example described below: Without use of the filter the sidelobe is down 13 dB. Allowing for 6 dB of detection margin, this allows detection of peaks that are 7 dB down. In contrast, with the use of the filter, the sidelobe is down 21 dB. Allowing for the same 6 dB of detection margin, this allows detection of peaks that are 15 dB down. The improvement can be viewed in two ways: How far is the sidelobe down (21−13), or how much does it improve detection sensitivity (15−7); either way, an improvement of 8 dB is achieved. Of course, persons skilled in the art will appreciate that the actual amount of improvement can be changed simply by using a different filter. The present invention is by no means limited to a specific filter implementation or range of sidelobe cancellation.

Another aspect of a preferred embodiment relates to the leading edge discovery procedure. According to this aspect, the TDOA value reported to the WLS is the value calculated by a predefined time-of-arrival determination procedure (the Tau procedure described below) performed after the leading edge discovery procedure successfully finds an earlier leading edge.

The present invention also encompasses a wireless location system (WLS) comprising a network of location measurement units (LMUs) including at least a first LMU and a second LMU, wherein at least the first LMU includes a processor and a computer readable storage medium comprising instructions for configuring the processor to compute TDOA estimates in accordance with the prescribed method recited above.

We will now describe several different exemplary environments in which the present invention may be advantageously employed. Following this, we will describe the inventive time of arrival detection techniques in greater detail.

Overlay WLS Environments

Figure 1B:
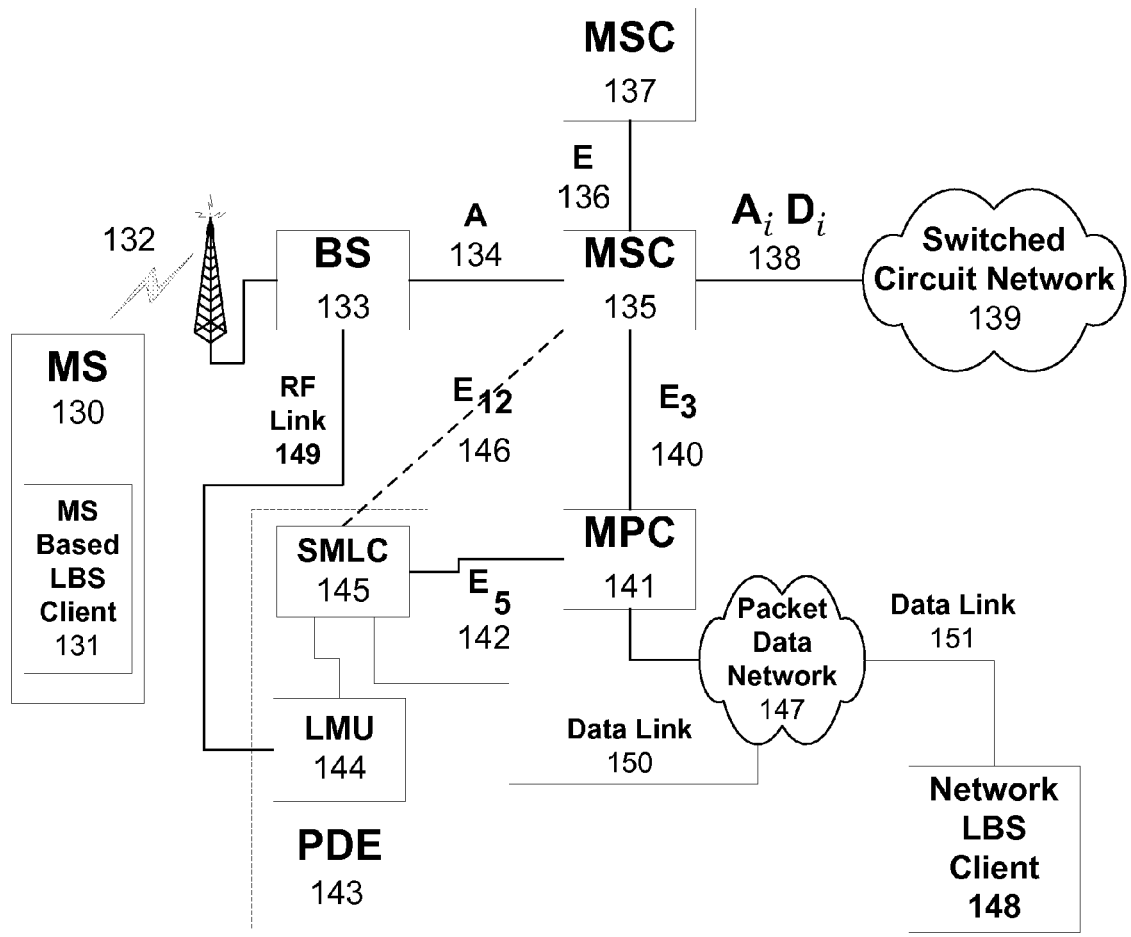
FIG. 1b schematically depicts a Wireless Location System for use with a CDMA based wireless communications system.
Figure 1C:
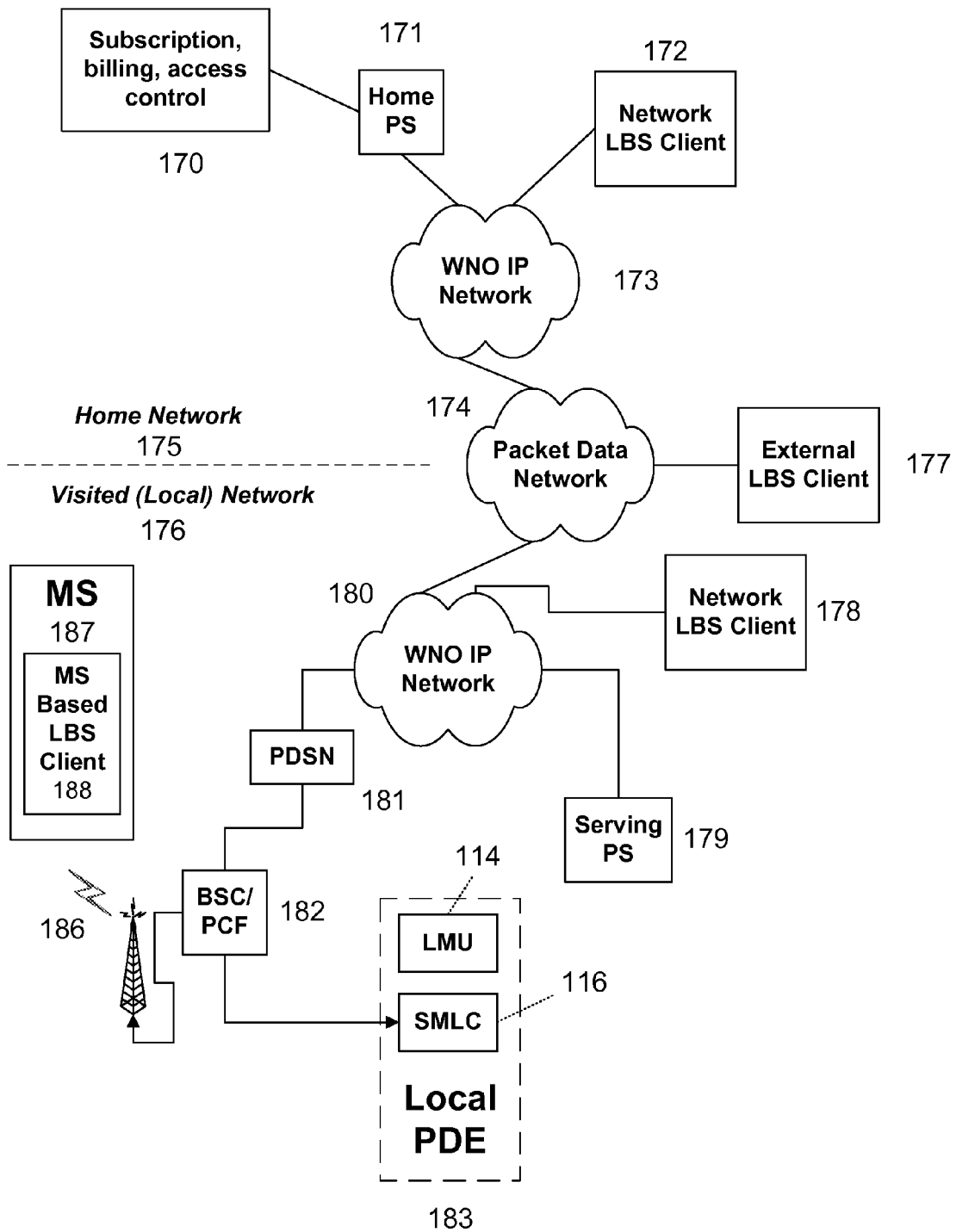
FIG. 1c schematically depicts a Wireless Location System for use with a CDMA all-IP based wireless communications system.

FIGS. 1a, 1b, and 1c are illustrative of the types of wireless communications networks that the present invention functions within. While the following subsections describe exemplary implementations of the communications system as a UMTS, IS-95 and CDMA2000 cellular communication systems, the teachings of the present invention are analogously also applicable to other wideband, spread spectrum packet radio communication systems that are implemented in other manners.

FIG. 1a

FIG. 1a shows the architecture of an illustrative UMTS network reference model for the present invention.

UE (100)

The UMTS UE (User Equipment) 100 is the logical combination of the ME (Mobile Equipment) 101 and SIM/USIM (Subscriber Identity Module/UMTS Subscriber Identity Module) 102. The UE is the formal name for the UMTS handset or mobile.

ME (101)

The Mobile Equipment (ME) 101 is the hardware element of a mobile station and comprises of keyboard, screen, radio, circuit boards and processors. The ME processors support both communications signal processing and processing of various UE-based services that may include a UE-based LCS Client application.

USIM (102)

The USIM (UMTS Subscriber Identity Module) 102, also referred to as a SIM card, is a programmable memory device what holds the user subscription information to the UMTS mobile network. The USIM contains relevant information that enables access onto the subscribed operator's network and to UE-based services that may include a UE-based LCS Client application.

Node B (105)

The Node B 105 is the function within the UMTS network that provides the physical radio link between the UE 100 (User Equipment) and the land-side network. Along with the transmission and reception of data across the radio interface the Node B also applies the codes that are necessary to describe channels in a W-CDMA system. The Node B supplies timing information to UEs 100 over the Uu 105 interface. The Node B access the Uu interface via wired antenna feeds 104.

The UTRAN (UMTS Terrestrial Radio Access Network) comprises one or more RNS (Radio Network Subsystem). Each RNS comprises one or more RNC 107 and their supported Node B's 105. Each RNS control the allocation and the release of specific radio resources to establish a connection between a UE 100 and the UTRAN. A RNS is responsible for the resources and transmission/reception in a group of cells.

S-RNC (107)

When a RNC 107 (Radio Network Controller) has a logical RRC (Radio Resource Control) connection with a UE (User Equipment) via the Node B 105, it is known as the S-RNC 107 for that UE 100. The S-RNC 107 is responsible for the users mobility within the UTRAN network and is also the point of connection towards the CN (Core Network) 112. The S-RNC 107 connects to the Node B via the 3GPP standardized Iub interface 106.

D-RNC (108)

When a UE 100 (User Equipment) in the connected state is handed onto a cell associated with a different RNC it is said to have drifted. The RRC (Radio Resource Control) connection however still terminates with the S-RNC 107. In effect the D-RNC 108 acts as a switch, routing information between the S-RNC 107 and the UE 100.

C-RNC

The Controlling Radio Network Controller is the RNC (Radio Network Controller) responsible for the configuration of a Node B. A UE (User Equipment) accessing the system will send an access to a Node B, which in turn will forward this message onto its CRNC. The C-RNC is nominally the S-RNC.

Core Network (112)

The Core Network 112 provides the functions of mobility management, exchange services for call connection control signaling between the user equipment (UE) and external networks, and interworking functions between the UTRAN radio access network and external packet and switched circuit networks. The Core Network also provides billing functionality, security and access control management with external networks.

LMU (114)

The Location Measurement Unit (LMU) makes radio measurements to support positioning of UE. The LMU may be an overlay addition to the UMTS network or may be integrated into the hardware and software of the Node B. In the present invention, the LMU receives the Um radio interface for development of TDOA and/or TDOA/AoA calculated location and velocity estimates. The LMU connects to cell site antenna or to the Node B via a radio coupler to the antenna feed 113.

Examples of a U-TDOA and U-TDOA/AOA LMU have been previously described in U.S. Pat. No. 6,184,829, Calibration for a Wireless Location System; U.S. Pat. No. 6,266,013, Architecture for a Signal Collection System in a Wireless Location System; and U.S. Pat. No. 6,108,555, Enhanced Time Difference Localization System, all owned by TruePosition and incorporated herein by reference.

SMLC (116)

The SMLC 116 is a logical functional entity implemented either a separate network element (or distributed cluster of elements) or integrated functionality in the RNC 107. The SMLC 116 contains the functionality required to support Location Based Services. The SMLC 113 is the logical entity that provides the bridge between the wireless network and the location network (LMU 114, SMLC 116, and GMLC 119) by possessing data concerning the geographical area as well as the radio network topology. The SMLC 116 manages the overall co-ordination and scheduling of LMU 114 resources required for the location of a mobile. It also calculates the final location, velocity, and altitude estimates and estimates the achieved accuracy for each. In the present invention, the SMLC 116 controls and interconnects a set of LMUs via packet data connections 115 for the purpose of obtaining radio interface measurements to locate or help locate UE 100 in the geographical area that its LMUs serve. The SMLC 116 contains U-TDOA, AoA and multipath mitigation algorithms for computing location, confidence interval, speed, altitude, and direction of travel. The SMLC 116 can also determine which wireless phones to locate based upon triggering from the Link Monitoring System (LMS) 124 or requests from the 3GPP standardized Iupc interface 117 to an infrastructure vendor's Radio Network Controller (RNC) Station Controller 107.

GMLC (119)

The Gateway Mobile Location Center (GMLC) 119 is defined by 3GPP standards as the clearinghouse for location records in a GSM/GPRS/UMTS network. The GMLC 119 serves as a buffer between the tightly controlled SS7 network (the GSM-MAP and CAP networks) and the unsecure packet data networks such as the Internet. Authentication, access control, accounting, and authorization functions for location-based services are commonly resident on or controlled by the GMLC 119. A Gateway Mobile Location Center (GMLC) is a server that contains the functionality required to support LBS services as well the interworking, access control, authentication, subscriber profiles, security, administration, and accounting/billing functions. The GMLC also has the ability to access the GSM-MAP and CAP networks to discover subscriber identity, request and receive routing information, obtain low-accuracy UE location, and to exert call control based on UE location. In any UMTS network, there may be multiple GMLCs.

Network LCS Client (122)

A Network LCS Client 112 is the logical functional entity that makes a request to the PLMN LCS server for the location information of one or more than one target UEs. In the UTMS network depicted in FIG. 1, the LCS server is implemented as software and data on the GMLC 119 platform. This inclusion of the LCS server with the GMLC 119 is typical for deployed systems. An LCS server comprises a number of location service components and bearers needed to serve the LCS clients. The LCS server shall provide a platform which will enable the support of location based services in parallel to other telecommunication services such as speech, data, messaging, other teleservices, user applications and supplementary services. The Network LCS client uses the Le interface 121 to access the GMLC. The network LCS client can communicate with the GMLC-based LCS server 119 to request the immediate, periodic or deferred location information for one or more target UEs within a specified set of location-related quality of service parameters if allowed by the security and privacy protections provided by the GMLC-based LCS server 119

Mobile LCS Client

The Mobile LCS Client is a software application residing in the ME 101 of the UE 100 using the USIM 102 for non-volatile or portable data storage. The mobile LCS Client may obtain location information via the GMLC 119 using the Le Interface 121 over a wireless data connection.

LMS

The LMS 133 provides passive monitoring of UMTS network interfaces such as the Iub, Iur, Iu-CS and Iu-PS by means of passive probes (not pictured) reporting to a central server or server cluster. By monitoring these interfaces, the LMS 133 may develop tasking and triggering information allowing the SMLC 116 to provide autonomous, low-latency location estimates for pre-provisioned LBS applications. LMS 133 developed triggering and tasking information is delivered to the SMLC 116 via a generic data connection 123, normally TCP/IP based. The LMS 133 is a modification to the Abis Monitoring System (AMS) described in U.S. Pat. No. 6,782,264, "Monitoring of Call Information in a Wireless Location System" and later expanded in U.S. patent application Ser. No. 11/150414, "Advanced Triggers for Location Based Service Applications in a Wireless Location System," both incorporated herein by reference. The LMS 133 may be incorporated as software into the Node B 105 or RNC 107, 108 nodes of the UMTS system or deployed as an overlay network of passive probes.

Interfaces

The Uu interface 103 is the UMTS Air Interface as defined by 3GPP. This radio interface between the UTRAN (UMTS Terrestrial Radio Access Network) and the UE (User Equipment) utilizes W-CDMA and either Frequency Division Duplexing (FDD) or Time Division Duplexing (TDD). The UMTS radio interface is well described in 3GPP technical specifications 25.201 and 45.201, both entitled; "*Physical layer on the radio path; General description*". Specifics of the Uu radio interface as implemented in an FDD W-CDMA radio system are described in 3GPP Technical Specification 25.213, "*Spreading and modulation (FDD)*". Details and descriptions of the physical and logical channels used in a FDD W-CDMA UMTS are located in 3GPP Technical Specification 25.211, "*Physical channels and mapping of transport channels onto physical channels (FDD)*".

The Iub interface 106 is located in a UMTS radio network and is found between the RNC (Radio Network Controller) 107 and the NodeB 105. The Iub interface is as defined in 3GPP TS 25.430, "*UTRAN Iub Interface: general aspects and principles*".

The Iur 109 interconnects the UMTS Server or core RNC 70 with the Drift RNC 108 in the UMTS network. The Iur interface is standardized in 3GPP Technical Specification 25.420, "*UTRAN Iur Interface: General Aspects and Principles*"

The Iu-CS (Circuit Switched) interface 110 connects the UMTS RNC 107 with the circuit switched communications oriented portion of the Core Network 112.

The Iu-PS (Packet Switched) interface 111 connects the UMTS RNC 107 with the packet switched communications oriented portion of the Core Network 112.

The Iupc 117 interconnects the UMTS RNC 70 with the SMLC (also called the SAS) in the UMTS network for location estimation generation. The Iupc interface is introduced in 3GPP Technical Specification 25.450, "*UTRAN Iupc interface general aspects and principles*".

The E5+ interface 118 is a modification of the E5 interface defined in the Joint ANSI/ETSI Standard 036 for North American E9-1-1. The E5+ interface 118 connects the SMLC 116 and GMLC 119 nodes directly, allowing for push operations when LMS 114 triggers are used by the wireless location system with either network acquired information (cell-ID, NMR, TA, etc) or via TDOA and/or AoA (angle of arrival) performed by the LMU's 114 specialized receivers.

The Le interface 121 is an IP-based XML interface originally developed by the Location Interoperability Forum (LIF) and then later standardized by the 3rd Generation Partnership Program (3GPP) for GSM (GERAN) and UMTS (UTRAN). The Location-based services (LBS) client 122 is also known as a LCS (Location Services). The LBS and LCS services resident on the LCS Client 122 are software applications, data stores, and services uniquely enabled to use the location of a mobile device.

FIG. 1b

FIG. 1b schematically depicts a representative configuration of the major components of a wireless communications system based on that described in the ANSI/ETSI Joint Standard "J-STD-036", *Enhanced Wireless 9-1-1 Phase 2*. For the present invention, FIG. 2b is used to represent an implementation present invention within an TIA-EIA-95 (IS-95) based CDMA wireless communications system with standardized nodes and interfaces. Although originally created in support of emergency services (E911, E112), this functional network can also be used for commercial location services delivery in a mixed circuit switched, packet switched network where the MSC 135 and MPC 141 communicate with the ANSI-41 protocol using the link E3 140. The present invention resides within the Positioning Determining Equipment 143 node of the reference network.

MS

The CDMA Mobile Station (MS) 130 is a hardware software system allowing user access to the CDMA radio interface 132 and thus the complete wireless communications network and services.

The MS 130 may have a location based software application, the LBS Client 131 in residence. The MS-based LBS client uses the resources provided by the MS 130 to function.

The IS-95 Base Station comprises a BSC (Base Station Controller) and one or more BTS (Base Transceiver Station (s)). The BS 133 provides the functionality that enables a mobile to access network interfaces and services over the IS-95 CDMA air interface.

The BS 133 interfaces the CDMA radio interface 132 with land-based wireless communications system network. The BS 133 provides channel allocation to the MS 130, power control, frequency administration, and handover (soft, softer and hard) between other proximate BS.

The A interface 134, nominally a IS-634 compliant interface for IS-95 CDMA systems, interfaces the BS 133 to the MSC 135, carrying control messaging between the MSC 135 and BS 133 and DTAP (Direct Transfer Application Part) messaging from the MSC 135 intended for the MS 130.

The MSC (Mobile Switching Center) 135 provides the functions of mobility management, exchange services for call connection control signaling between the MS 130 and external switched circuit networks 147, and interworking functions between the CDMA radio access network and external packet switched networks. The MSC 135 also provides call routing and billing functionality. In some vendor implementations, the MSC 135 also provides interworking, routing, and transcoding services for digital packet communications.

The MSC 135 may connect with other MSC 137 using the ANSI-41 defined E interface 136.

The MSC 135 connects to switched circuit networks 139 with control interfaces such as the ISDN User Part (ISUP) as standardized (Telcordia GR-154 and T1.113) as the Ai/Di 138 interfaces and trunks.

The J-STD-036 standardized E3 140 interface is used to connect the MSC 135 to the MPC 141. E3 is an ANSI-41 based interface that includes Wireless Intelligent Networking (WIN) capabilities for location.

The MPC (Mobile Position Center) 141 is the gateway between the mobile network, location networks, and network-based location applications. The MPC 141 acts as router and protocol converter between the E5 interface 142 specific TCAP over TCP/IP-based, J-STD-036 defined, Location Services Protocol, the E3 interface 140 ANSI-41 messaging and the TCP/IP based data link 151 to external LBS clients 148. The MPC may select among deployed PDE 143 based on quality of service parameters included in the E3 140 messaging.

The MPC connects to Position Determining Entities (PDE) 143 via the aforementioned E5 interface. In the present invention, the PDE 143 comprises a cluster of centralized processors, the serving Mobile Location Center (SMLC) 116 and a geographically distributed population of Location Measurement Units (LMU) 114 interconnected by a proprietary TCP/IP-based interface 115. The LMU 114 connects to the BSC 133 via either a radio frequency antenna feed 149 from the BS's 133 receive antennae or alternately a data link carrying a digitized representation of the received signal from each receive antennae of the BS 133.

Although not part of the J-STD-036 defined LBS network, the SMLC 116 may communicate directly with the Network LBS Client 148 and via data connection to the MS based LBS client 133 over a packet data connection link 150 to a generic Packet Data Network 147.

FIG. 1c

FIG. 1C schematically depicts a representative configuration of the major components of a wireless communications system and wireless location system based a packet-based transport network. In this figure, the wireless communications system is assumed to be based on the IS-2000 CDMA or CDMA2000® system.

This packet-based (also known as the all-IP based) LBS network is described by 3GPP2 standards; TIA-1020, *IP based location services* (3GPP2 x.P0024); TIA-881, *LS Authentication/Privacy/Security Enhancements* (3GPP2 X.P0002); TIA-843, *Wireless Intelligent Network LBS Phase III* (3GPP2 X.P0009); and TIA-801, *Position Determination Service for cdma*2000®. The present invention would be implemented in the local PDE.

The all-IP wireless communication system depicted in FIG. 1c includes a home network 175 part and a visited network 176 part. In many cases the Visited Network 176 will be the Home network 175. The Home network 175 and Visited Network 176 are connected together by way of a packet data network 174 such as the public Internet. Each network part, Home 175 and Visited 176 comprises multiple functional entities interconnected by local Wireless Network Operator IP Networks 173, 180.

For the enabling of location based services, A Home Positioning Server (H-PS or just PS) 171 interconnects via packet-based connections with the administration node 170 which supplies subscription and user profile storage, LBS services administration and access control. For the delivery of LBS services the H-PS 171 may interconnect to a home network 175 based Network LBS Client 172, an external LBS client 177, a Visited Network 176 based LBS Client 178 or an MS-based LBS Client 188. For the obtaining of current or historical location of the MS 187, the H-PS 171 may interconnect via packet-based data connections to the local PDE 183.

The H-PS 171 plays the same role as a Home network MPC in IS-41 network in respect to the roles of authentication, access control, administration, and accounting functions.

The Packet Data Serving Node (PDSN) 181 acts as the connection point between the radio access and Visited Network 176. This component is responsible for managing PPP sessions between the mobile provider's core IP network and the mobile station The S-PS or Serving Positioning Server 176 is a PS in a visited network. The Serving PS 176 provides position information of visiting MS to requesting entities such as the Home PS 171, Network LBS clients . It plays the same role as Serving MPC in IS-41 network and acts as the local proxy for the H-PS 171 in respect to the roles of authentication, access control, administration, and accounting functions.

The BSC/PCF 182 is the base station controller/packet control functional node. The BSC/PCF 182 node manages interconnections and communications between the radio network 186 and the PDSN. The BSC/PCF 182 is responsible for the transparent exchange of traffic and signaling messages between the MS 187 and network-based destinations.

The radio network 186 comprises the actual CDMA2000® air interface and the radio transmission facilities alternately called BS (base stations), BTS (Basestation Transceiver Sites, AP (Access Points) and cells. The radio network 186 interconnects the BSC/PCF 182 with the MS 187 for packet data and packetized voice communications.

In the present invention, the local PDE 183 includes a server cluster based SMLC 116 and a geographically distributed population of LMU 114.

The PDE 183 interacts with the MS 187 (possibly using the PS's 171, 179 as proxies) to provide location services to the user via the MS-based LBS client 188 or to other LBS Clients 172, 177, 178 based on the mobile's location.

Other elements of the all-IP, packet architecture of the wireless communication system for reasons of simplicity, are not shown.

Detailed Description of Improved TOA Detection in a WLS

The uplink time difference of arrival (U-TDOA) location method, at its most basic level, relies on the assumption that a direct line of sight (LOS) path with sufficient signal energy exists between the transmitter and the receiver stations. An unobstructed LOS path does not necessarily need to exist between the transmitter and the receiver; however, it is assumed that the signals do not undergo a change in direction due to reflections, diffraction, ducting, etc. This assumption is made in order to convert the time difference of arrival into the spatial straight-line distance from the mobile station to the primary and cooperator LMUs. In reserved wireless communications bands, which currently include the 850/1900 MHz (North American) and the 900/1800/2100 MHz (European) cellular, GSM, PCS, DCS, and UMTS frequency bands, a significant amount of the signal energy received by the radio receiver stations employed for wireless communications networks is due to the multi-path components. In fact, in CDMA systems this multipath fading characteristic of broadband systems is actually used to lessen the required fade margin.

As originally disclosed in U.S. Pat. No. 5,327,144, "Cellular Telephone Location System", Stilp et al, the signal of the emitter to be located, in this case a CDMA mobile device, is collected by a cluster of geographically dispersed specialized receivers (Location Measurement Units or LMUs, formerly called Signal Collection Systems or SCS's). The Wireless Location system (WLS), when triggered by a radio monitoring sensor, a link-monitoring system, or by a request from the wireless operator, first performs radio signal metrics collection and determination of best LMU and a set of cooperating LMUs. The best LMU is normally associated with the serving cell antenna whereas the cooperating LMUs are nominally those in close geographic proximity to the best/serving LMU with acceptable SNR and Eb/No and that do not create large geometric-dilution-of-precision. The best (signal-wise) LMU preferably uses a wideband receiver to collect and digitize RF for a sample period. Digital signal processing software within the LMU models a rake receiver and demodulates the CDMA-modulated signal of interest conventionally. This demodulated 'perfect' reference signal is sent to cooperator LMUs selected on the basis of radio metric collection. Each cooperator LMU re-modulates the reference and uses this in a correlation process to determine the time of arrival (TOA) of the signal of interest at the best/serving LMU.

In a preferred implementation of the present invention, the re-modulated reference and the recorded received signal are correlated with the reference signal shifted over likely time and frequency ranges. An asymmetric, linear phase Finite Impulse Response (FIR) filter is applied in the timewise axis, and this results in suppression of leading (earlier in time) sidelobes. Sidelobes on the later arriving side are not examined. The FIR filter produces a reduction of at least eight Decibels (8 dB) in the amplitude of the earlier side sidelobes. This operation produces a time/frequency/correlation map for the possible range of times and frequencies.

The time/frequency/correlation map is then constrained as taught in U.S. Pat. No. 6,876,859, "Method of Estimating TDOA and FDOA in a Wireless Location System" and is searched for a global maximum correlation peak. Once the global maximum correlation peak is discovered, the search space is confined to the frequency at which the global maximum correlation peak is found. The new search space, deemed a 'timeslice", is then searched in time for an earlier, local maximum correlation peak. This peak will be discovered if the correlation value is above the detection assurance threshold.

Once the timeslice is searched for the earliest correlation peak above the detection assurance threshold, the leading edge discovery procedure is applied. The intention of the leading edge discovery procedure is to find an earlier arriving signal hidden in the correlation envelope created by the additive effects of multi-path reflections.

In a preferred implementation of the leading edge discovery procedure, the timeslice, centered on the earliest found maximum correlation peak, is divided into time bins in both the leading (earlier) and trailing (later) directions. This operation also creates two additional thresholds based on the correlation value of the earliest found maximum correlation peak.

Leading Sidelobe Reduction

If there is significant multi-path, and the strength of a received reflected signal is stronger than the received LOS signal, the maximum value of the cross-correlation will occur at a time corresponding to this reflection and thus at a greater delay value. A leading correlation peak search algorithm can be used to attempt to mitigate this problem. Leading peaks in the cross-correlation due solely to the combined impulse responses of the all of the transmitter and receiver filters, however, can significantly limit the effectiveness of such an algorithm. These filters are used to both limit the bandwidth of the transmitted signal and to minimize (or eliminate) the effects of adjacent symbol interference.

Applied during the correlation processing for the reference and local CDMA signals, the leading impulse response peaks can be reduced by inserting an additional filter in the cross-correlation processing data flow. This filter changes the overall impulse response such that the leading peaks (sidelobes) of the impulse response are minimized. There are many such filters that can be utilized.

An example of one type is presented here. This filter is an all-pass, phase shifting filter. What that means is that the frequency response of the filter is flat, with substantially no variation with frequency. The phase response does however vary as a function of frequency. This particular example can be represented by its transfer function:

$$H(s) = ((s-a)^2 + a^2)/((s+a)^2 + a^2)$$

The radian frequency response, $H(\omega)$, of this filter can be determined by replacing s in the above equation by $j\omega$ where $j=\sqrt{(-1)}$, the imaginary component. With this simple filter, the resulting impulse response can be modified by simply changing the value of "a".

A typical cross-correlation calculation is computed using FFTs (Fast Fourier Transforms). This filter can be implemented by multiplying the product of the reference and received signal FFTs by the complex frequency response of the filter before performing the IFFT (Inverse Fast Fourier Transform) to obtain the cross-correlation. FIG. 3*b* shows the resulting cross-correlation with the addition this kind of filter.

The value of "a" has been optimized to result in the minimum worst case value for any of the leading peaks.

As can be seen in FIG. 3b, the largest leading peak has been reduced to about 21 dB down from the main lobe peak. Again, using a 6 dB noise margin results in the ability to detect a line of sight received signal component that is 15 dB below the later reflection path signal rather than only 7 dB without the filter. This example filter is only presented here to show the improvement that can be made using a simple filter response. A more thorough investigation and optimization of the filter response to more closely match the exact filter response of the original combined filter response should result in even further reduction of the worst case value for any of the leading peaks.

Leading Edge Detection

An earlier CDMA leading edge discovery algorithm required that a correlation peak occurring before the global maximum correlation peak be a local maximum above the detection assurance threshold for successful detection. This precluded the WLS from finding a leading edge hidden within the correlation envelope of the earliest maximum correlation peak as a ledge or ramp. In a preferred implementation of the inventive method described herein, if the LMU fails to find an earlier leading edge, the timeslice will be resampled and a set of correlation thresholds will be set. The time earliest maximum correlation peak is set to "B". The thresholds are based on the value of the earliest maximum correlation peak and the value of the sample one interval later. These thresholds are described by the equations:

$W > 0.7 *$ correlation value at time $T=B+1$, $Y > 0.2 *$ earliest maximum correlation peak at time $T=B$, and $Z >$ detection assurance threshold or 0.01.

Starting from the earliest maximum correlation peak, the algorithm steps timewise, comparing earlier samples or bins against the three thresholds (W, Y, Z). Once the correlation value of the sample drops below any of the thresholds, the algorithm counts the samples from the earliest maximum correlation peak to the earliest valid (above all thresholds) sample.

The number of sample "m" is then used to find the earliest time-of-arrival. If m=0, then the time of the previous earliest maximum correlation peak remains the time-of-arrival for the locally received signal. For all values of m greater than zero, the following algorithm (denoted the Tau algorithm) is used to establish the time-of-arrival.

Tau=¼*(chip rate)−$m$/2*(chip rate)+(0.7−$c$)*$w$

Where m=number of bins between earliest valid bin and bin of maximum correlation peak (in this example, m=4),
chip rate=as per Table 1:

TABLE 1

Chip rates for spread spectrum technologies
CDMA Chip Rates

| Name | Standard | Chip Rate (in 1 * $10^6$ chips sec) |
|---|---|---|
| CDMA or CDMAOne ™ | TIA/EIA/IS-95 | 1.2288 |
| CDMA2000 ™ | TIA/EIA/IS-2000 | N * 1.2288 where N = 1, 3, 6, 9, or 12 |
| W-CDMA | 3GPP-UMTS | 3.84 | c=(correlation value of main correlation peak)/(correlation value one bin later than the main correlation peak bin);
w=empirically determined offset determined by use of measurement of mobiles with known location. For IS-95 in dense urban environments, this offset is 678.

Once Tau is computed, the time Tau 417 is subtracted from the time corresponding to the maximum correlation peak 405 resulting in a new time-of-arrival 418 which will be used in computation of the time-difference-of arrival for the CDMA mobile device.

We will now summarize the foregoing detailed description with reference to FIGS. 2-5.

Figure 2A:
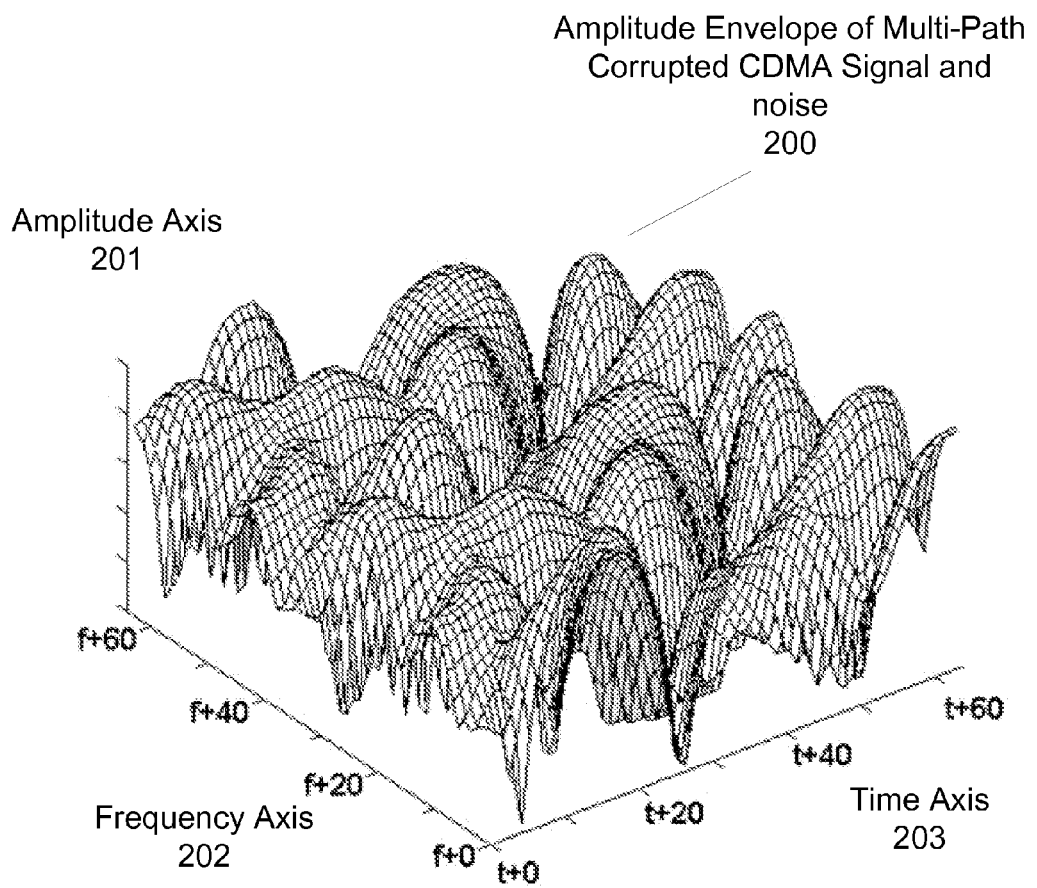
FIG. 2a depicts a representative time-frequency-correlation map of a received spread spectrum CDMA signal with multipath components.
Figure 2B:
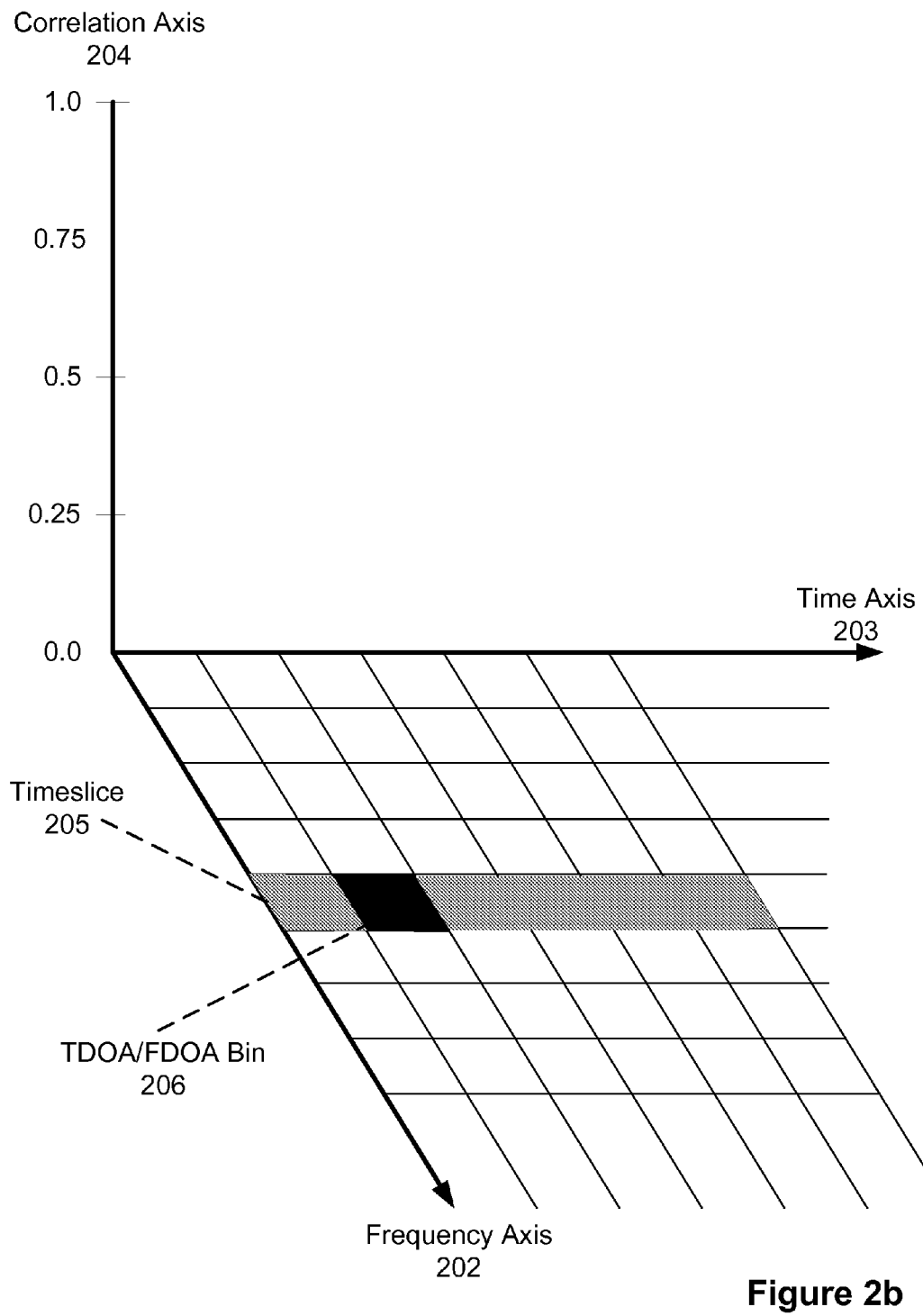
FIG. 2b depicts a representative time-frequency-correlation map with terminology.

FIG. 2a shows the frequency-shifted, multi-path and noise corrupted spread spectrum signal 200 used for CDMA as received by an LMU. The signal 200 is shown plotted in three dimensions consisting of amplitude 201, frequency 202, and time 203 axes.

FIG. 2b is used to illustrate the terminology used in the present invention. The search space comprises the three dimensions of correlation 204, time 203, and frequency 202. A timeslice 205 is shown covering a range of times over a fixed frequency. A bin 206 is shown denoting a fixed time and frequency.

Figure 2C:
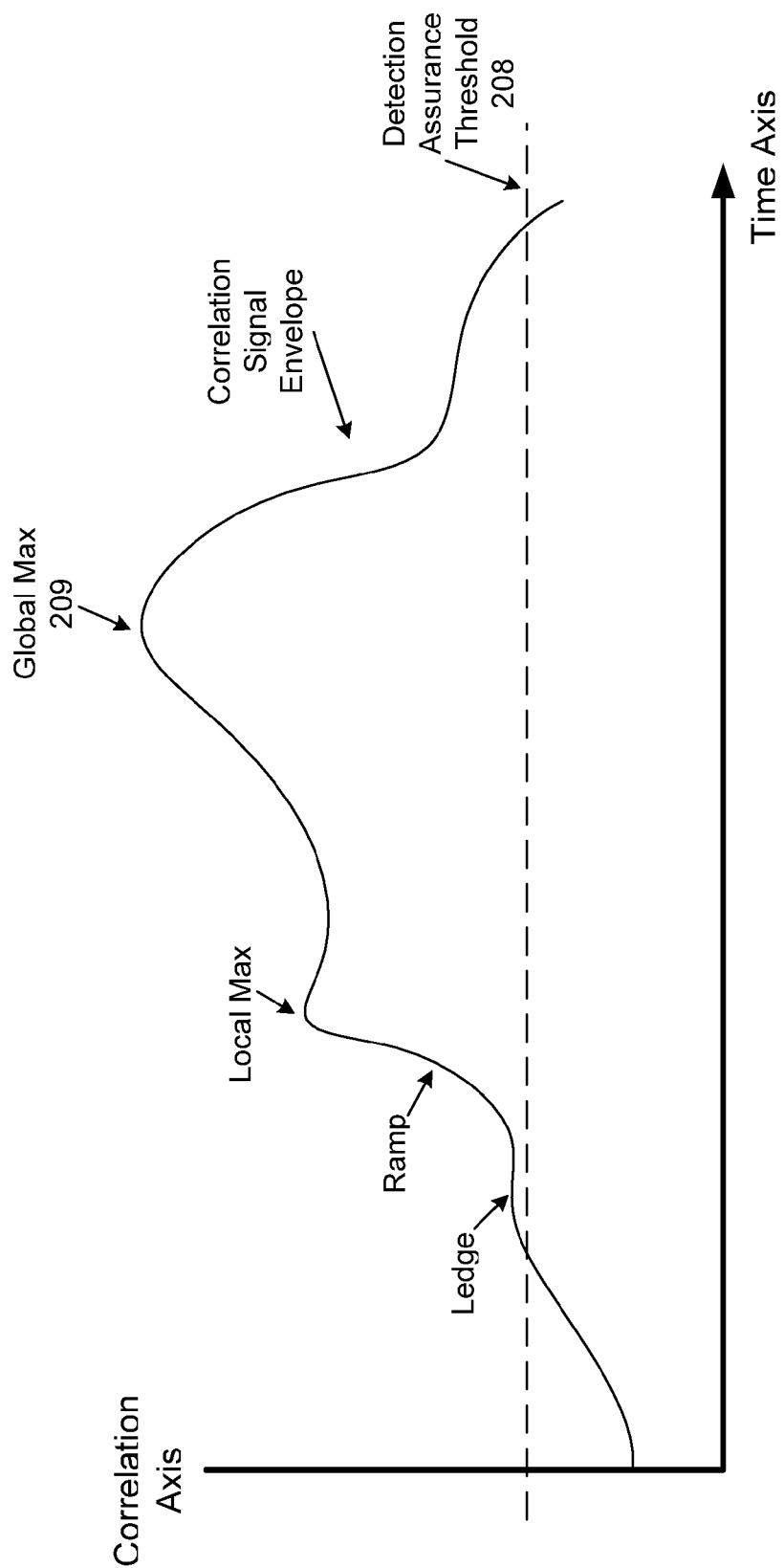
FIG. 2c depicts a representative time-correlation timeslice with descriptive terminology.
Figure 2D:
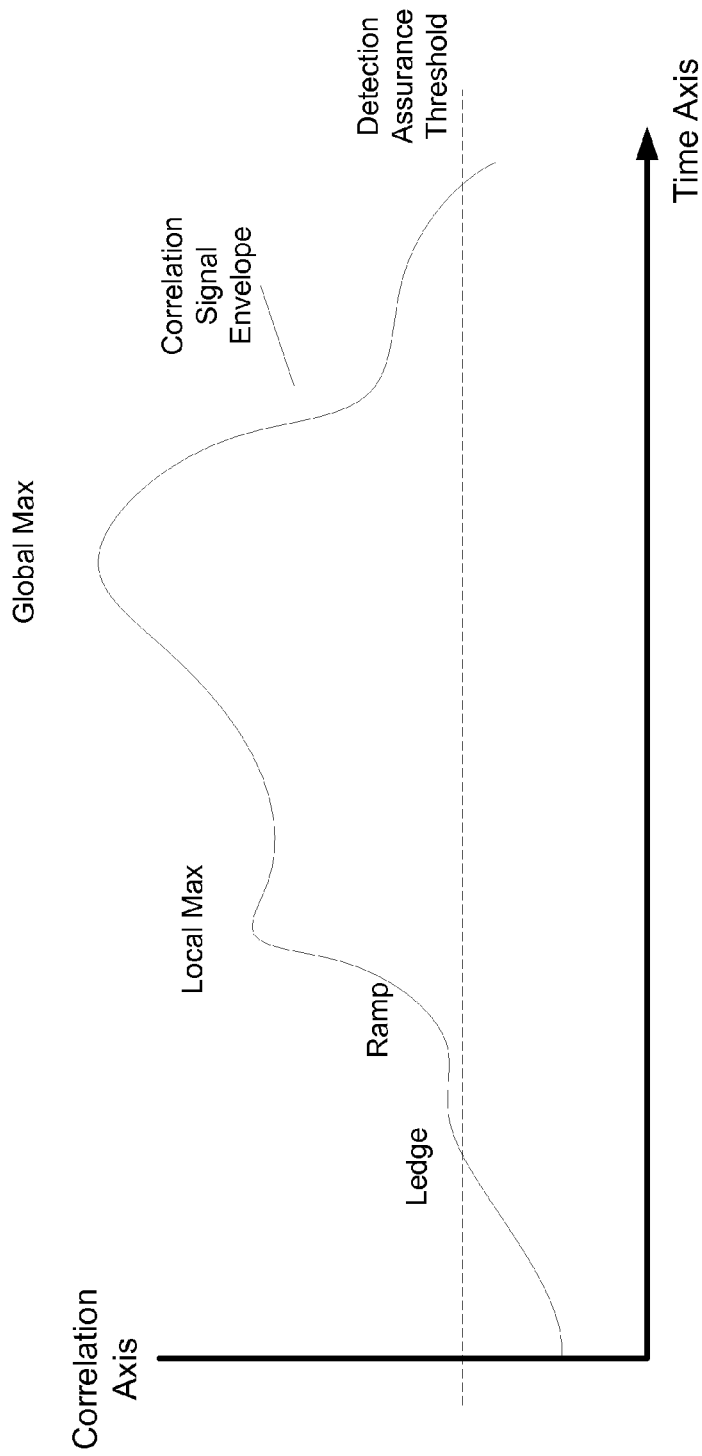

FIG. 2c shows a representative time-correlation timeslice. A detection threshold 208 is shown illustrating the minimum acceptable correlation. The global maximum correlation 209 is shown. Once the global maximum correlation 209 is found, the search space is then confined to the timeslice centered on the frequency of the global maximum correlation.

Figure 3A:
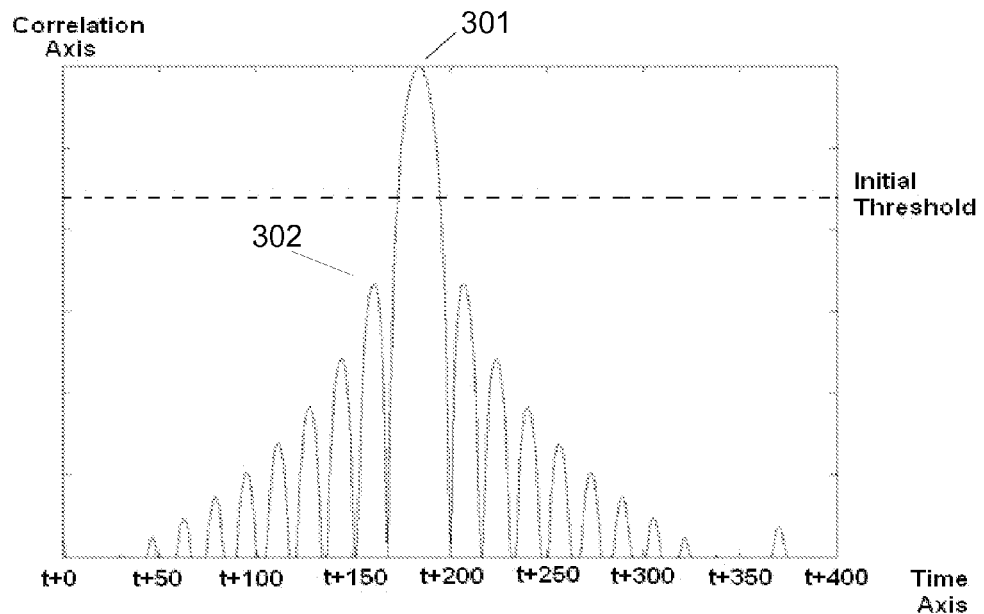
FIG. 3a shows a timeslice representation of correlated CDMA signals (reference and local) with attendant sidelobes.
Figure 3B:
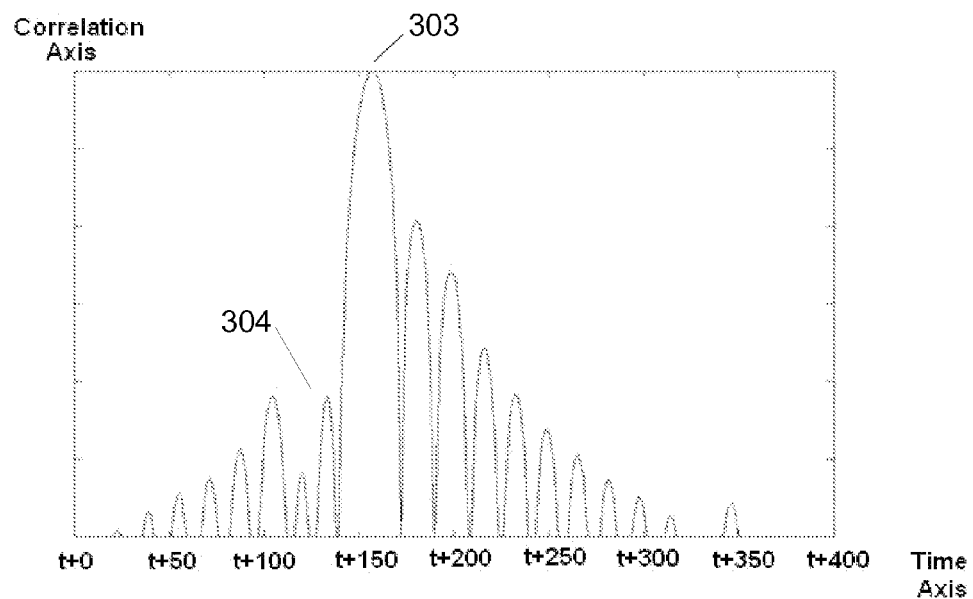
FIG. 3b shows a timeslice representation of correlated CDMA signals (reference and local) with attendant sidelobes after processing by a asymmetric, linear phase Finite Impulse Response (FIR) filter.

FIG. 3a shows a timeslice containing the correlated local and reference signals 207 and the detection threshold 300 before application of the sidelobe reduction via application of the Finite Impulse Response (FIR) filter. In this example, the first leading edge peak (sidelobe) 302 is only slightly reduced in amplitude from the main lobe correlation peak 301.

FIG. 3b shows the timeslice containing the filtered correlated local and reference signals 301 and the detection threshold after application of the sidelobe reduction via application of the FIR filter. By reducing the sidesloes of the peak correlation signal, earlier arriving signals may be exposed. In this example, the leading sidelobe reduction would expose a hidden earlier-arriving correlation peak ahead of the main lobe.

Figure 4A:
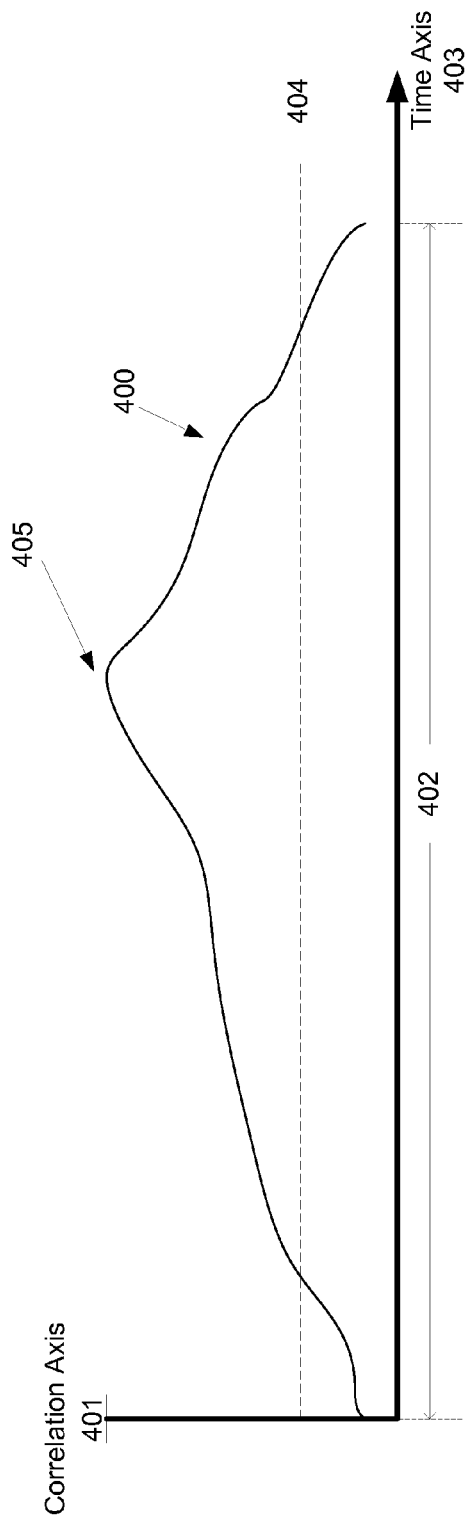
FIG. 4a depicts an example CDMA timeslice.
Figure 4B:
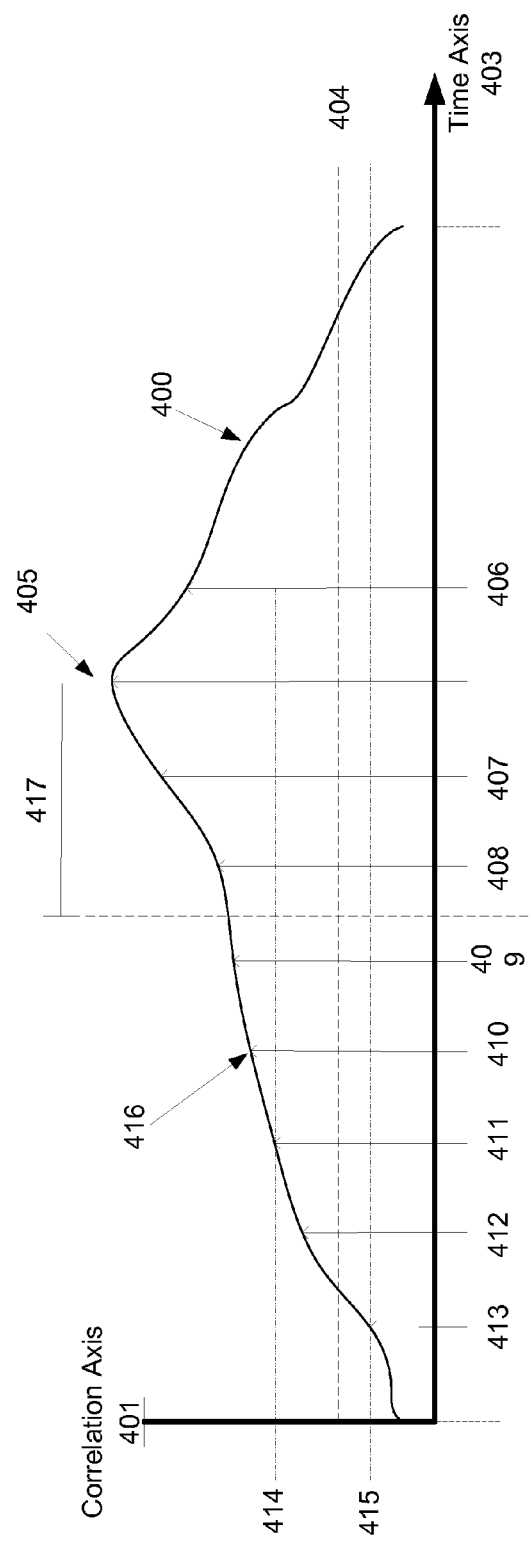
FIG. 4b illustrates a process used on the example CDMA timeslice to discover earlier arriving leading edges of the CDMA signal hidden within the correlation envelope.

FIG. 4a shows the correlation between the reference signal and the local signal 400 over the duration of the timeslice 402 containing the global maximum correlation peak 405. Once the global maximum correlation peak 405 is discovered and that global maximum correlation peak is above the detection threshold 404, the frequency offset is presumed discovered and the three-dimensional time-frequency-correlation search space is collapsed to the two-dimensional 'timeslice' of correlation versus time space. FIGS. 4a, 4b and 4c all show the two-dimensional search space as defined by the correlation axis 401 and the time axis 403. The search space time scope is now confined to the current bin 402 and earlier bins.

FIG. 4b shows the leading edge discovery process employed to find an earlier ray or signal leading edge occurring before the global maximum correlation 405. Since radio energy is additive, an earlier arriving ray may be hidden within the correlation envelope 400. In this example, the correlation envelope is resampled and two new thresholds are established. The first threshold 414 is a set at 70% of the correlation value one bin later 406 then the maximum correlation peak 405. The second threshold 415 is set at 20% of the maximum correlation peak. For each sampling 407, 408, 409, 410, 411, 412, 413 earlier than the maximum correlation peak 405, the value of the correlation envelope 400 is compared to the thresholds 404, 414, 415. When the correlation value falls below any of the three thresholds 411, the process falls back in time to the last valid sample 410. Once the last valid sample 410 is determined, the time-of-arrival is computed using the Tau (τ) formula described above.

Figure 5:
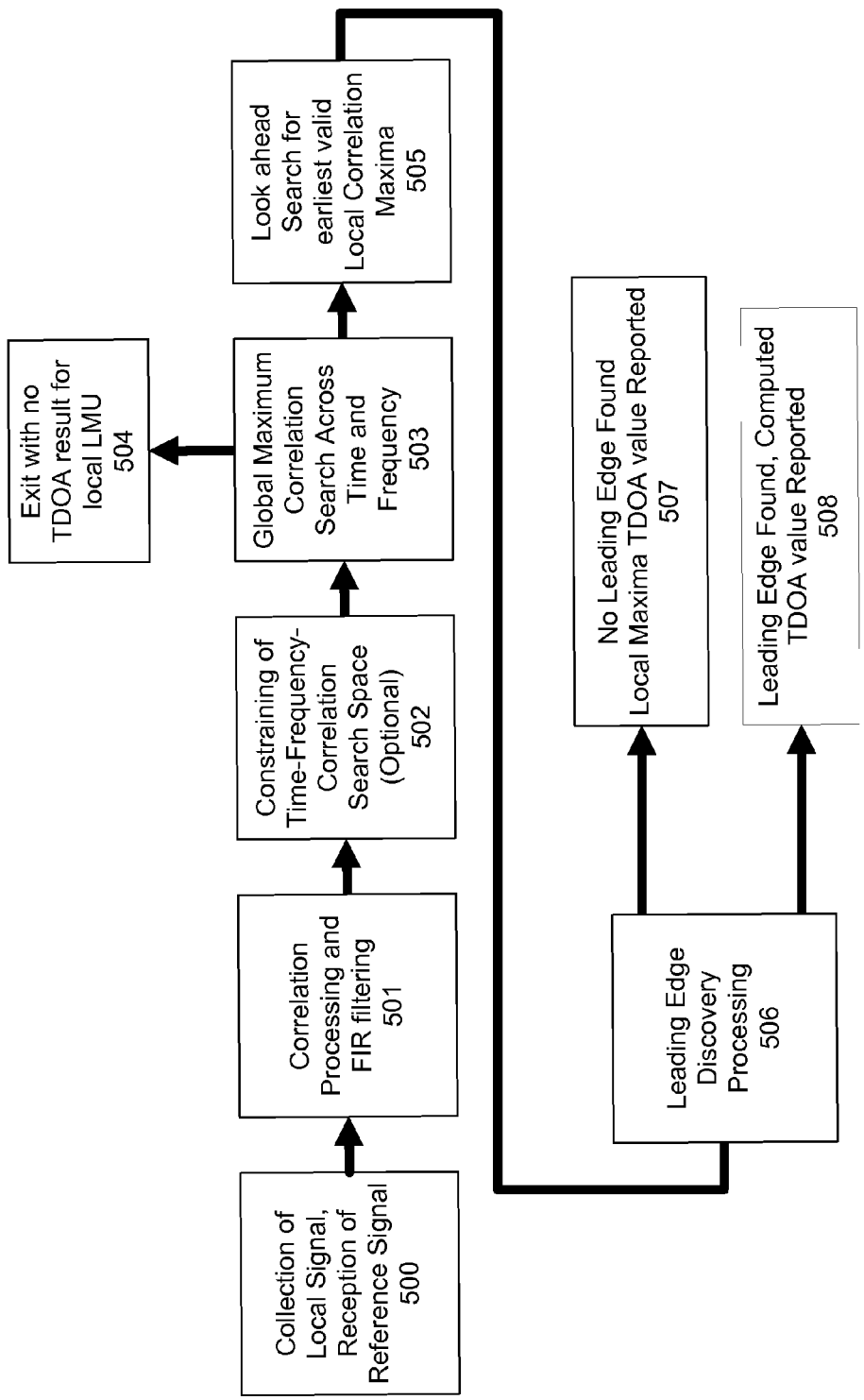
FIG. 5 is a flow chart of a process for determining TDOA values for CDMA signals in accordance with an illustrative implementation of the present invention.

FIG. 5 depicts the operational steps for the overall process described above. The first step 500 is the collection of the local signal and reception of the reference signal at the local LMU (for additional detail on the signal collection process, see U.S. Pat. No. 6,047,192, "Robust Efficient Localization System"). The second step 501 is the correlation with the timewise FIR filtering to reduce leading sidelobes. It is this second step that generates the correlation-time-frequency mapping that the third step 502 constrains (see U.S. Pat. No. 6,876,859 for additional detail). Constraining the three-dimensional search space in the time and frequency axes is optional, but makes subsequent correlation searches more efficient.

The next step 503 includes the search for the global maximum above the detection assurance threshold. If no global maximum above the detection assurance threshold is found, the procedure exits 504 and no TDOA value is produced for the local LMU. If a valid global maximum is detected, the correlation-time-frequency map is reduced to a two-dimensional time-correlation timeslice centered on the frequency of the detectable global maximum. The resulting timeslice is then searched for local maxima above the detection assurance threshold occurring earlier in time than the global maximum in step five 505. Once the earliest local maximum above the detection assurance threshold (which can be the previously discovered global maximum) is discovered, the leading edge detection operation 506 is used in an attempt to find an earlier leading edge concealed within the correlation envelope. If the leading edge detection operation fails to find an earlier leading edge, the process exits 507 successfully using the TDOA value of the earliest local maximum. If the leading edge detection operation successfully finds an earlier leading edge, then the TDOA value calculated by the Tau algorithm is reported 508.

CONCLUSION

The true scope the present invention is not limited to the presently preferred embodiments disclosed herein. For example, the foregoing disclosure of a presently preferred embodiment of a Wireless Location System uses explanatory terms, such as Location Measurement Unit (LMU, Serving Mobile Location Center (SMLC), and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA techniques. For example, the invention is not limited to systems employing an FIR filter of the kind described by way of example above, nor to LMU's constructed and deployed as described above. The LMU's and SMLC's, etc. are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the LMU) described herein to another functional element within the wireless communications network (such as the BS or base station) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

We claim:

1. In a wireless location system for use in locating a mobile transmitter, a method for improving a time difference of arrival (TDOA) estimate produced by cross-correlating a local signal with a reference signal, using either a time-domain or frequency-domain cross-correlation process, wherein the local signal is a copy of a signal transmitted by the mobile transmitter as received at a first antenna and the reference signal is a copy of the signal transmitted by the mobile transmitter as received at a second antenna, the method comprising:

receiving the local signal at a first location measurement unit (LMU);

processing the local and reference signals to produce a correlation function comprising a correlation-time-frequency map;

searching the correlation function for a global maximum above a detection assurance threshold, and identifying a valid global maximum correlation peak;

reducing the correlation-time-frequency map to a two-dimensional time-correlation timeslice centered on a frequency of the valid global maximum correlation peak;

searching the two-dimensional time-correlation timeslice for a local maximum above the detection assurance threshold occurring earlier in time than the global maximum correlation peak; and performing a leading edge discovery procedure to find an earlier leading edge concealed within a correlation envelope of the two-dimensional time-correlation timeslice.

2. A method as recited in claim 1, wherein the processing includes correlation processing and filtering of the local and reference signals to produce a correlation-time-frequency function comprising leading and trailing sidelobes, wherein said leading sidelobes are reduced in amplitude.

3. A method as recited in claim 2, wherein the filtering produces a reduction of at least eight Decibels (8 dB) in the amplitude of the leading sidelobes.

4. A method as recited in claim 3, wherein the filtering process comprises the use of a Finite Impulse Response (FIR) filtering process.

5. A method as recited in claim 4, wherein the FIR filtering process comprises an all-pass, phase shifting filtering process that produces a substantially flat frequency response.

6. A method as recited in claim 4, further comprising making a cross-correlation computation using a Fast Fourier Transform (FFT), wherein the FIR filtering process is performed by multiplying the product of reference and local signal FFTs by a complex frequency response of the FIR filtering process, and then performing an Inverse Fast Fourier Transform (IFFT) to obtain the cross-correlation function.

7. A method as recited in claim 2, further comprising determining limits for a constrained time-frequency correlation search.

8. A method as recited in claim 7, further comprising reporting the TDOA value of an earliest local maximum correlation peak after the leading edge discovery procedure fails to find an earlier leading edge.

9. A method as recited in claim 7, further comprising reporting the TDOA value calculated by a predefined timeof-arrival determination procedure (Tau) performed after the leading edge discovery procedure successfully finds an earlier leading edge.

10. A method as recited in claim 7, further comprising discovering a global maximum correlation peak; confining the search space to a selected frequency corresponding to the global maximum correlation peak; and then searching a timeslice corresponding to the selected frequency to identify an earlier, local maximum correlation peak.

11. A method as recited in claim 10, further comprising determining that the earlier, local maximum correlation peak is above the detection assurance threshold.

12. A method as recited in claim 11, comprising applying the leading edge discovery procedure to identify an earlier-arriving signal hidden in a correlation envelope created by the additive effects of multi-path reflections.

13. A method as recited in claim 11, wherein, in the leading edge discovery procedure, the timeslice centered on an earliest maximum correlation peak is divided into time bins in leading and trailing directions.

14. A method as recited in claim 13, wherein the leading edge discovery procedure comprises the creation of an additional threshold based on a correlation value of the earliest maximum correlation peak.

15. A method as recited in claim 14, wherein the leading edge discovery procedure includes the detection of a second correlation peak that occurs before the global maximum correlation peak and is a local maximum below the detection assurance threshold.

16. A method as recited in claim 15, wherein the second correlation peak is hidden as a ledge or ramp within a correlation envelope of an earliest maximum correlation peak.

17. A method as recited in claim 16, wherein the leading edge discovery procedure further comprises resampling the timeslice upon a failure to find an earlier leading edge and setting a plurality of correlation thresholds.

18. A method as recited in claim 17, wherein the earliest maximum correlation peak is set to a first value (B) and the thresholds are based on the value of the earliest maximum correlation peak and a value of a sample at a later interval.

19. A method as recited in claim 18, wherein said thresholds are determined in accordance with the following time-of-arrival determination procedure (Tau):

$$W > 0.7 * \text{correlation value at time } T=B+1,$$

$$Y > 0.2 * \text{earliest maximum correlation peak at time } T=B, \text{ and}$$

$$Z > \text{detection assurance threshold or } 0.01;$$

wherein, starting from the earliest maximum correlation peak, the time-of-arrival determination procedure steps timewise, comparing earlier samples against the thresholds (W, Y, Z) and, once the correlation value of the sample drops below any of the thresholds, the procedure counts the samples from the earliest maximum correlation peak to the earliest sample above all thresholds; and then the sample number (m) is used to find the earliest time-of-arrival according to the following rule set:

if m=0, then the time of a previous earliest maximum correlation peak remains the time-of-arrival for the locally received signal;

for all values of m greater than zero, the following rule is used to establish the time-of-arrival: Tau=¼*(chip rate)−m/2*(chip rate)+(0.7−c)*w, wherein m is the number of bins between an earliest valid bin and the bin of the maximum correlation peak; chip rate is determined based on a table defining chip rates for different spread spectrum technologies; c is the ratio of the correlation value of the main correlation peak to the correlation value one bin later than the main correlation peak bin; and w is an empirically-determined offset.

20. A method as recited in claim 19, wherein, once the time-of-arrival (Tau) is computed, Tau is subtracted from the time corresponding to the maximum correlation peak resulting in a new time-of-arrival that is used in a computation of the time-difference-of arrival.

21. A method as recited in claim 2, wherein the reference signal is obtained using a second LMU comprising a wideband receiver configured to collect and digitize a code division multiple access (CDMA)-modulated signal of interest for a sample period, and digital signal processing software within the second LMU models a rake receiver and demodulates the signal of interest.

22. A method as recited in claim 21, further comprising sending the demodulated signal of interest from the second LMU to the first LMU, and re-modulating the demodulated signal of interest at the first LMU to obtain the reference signal.

23. A method as recited in claim 22, further comprising, at the first LMU, recording the received local signal; correlating the recorded signal with the reference signal shifted over time and frequency ranges to produce a correlation function; and applying an asymmetric, linear phase Finite Impulse Response (FIR) filter in a timewise axis to suppress leading sidelobes of the correlation function.

24. A wireless location system (WLS) for use in locating a mobile transmitter, comprising:

a network of location measurement units (LMUs) including at least a first LMU and a second LMU; wherein said first LMU includes a processor and a computer readable storage medium coupled to said processor, said computer readable storage medium comprising instructions for configuring said processor to compute a time difference of arrival (TDOA) estimate in accordance with a prescribed method, including by cross-correlating a local signal with a reference signal, using either a time-domain or frequency-domain cross-correlation process, wherein the local signal is a copy of a signal transmitted by the mobile transmitter as received at a first antenna associated with the first LMU and the reference signal is a copy of the signal transmitted by the mobile transmitter as received at a second antenna associated with the second LMU, said prescribed method comprising:

receiving the local signal at said first location measurement unit (LMU);

processing the local and reference signals to produce a correlation function comprising a correlation-time-frequency map;

searching the correlation function for a global maximum above a detection assurance threshold, and identifying a valid global maximum correlation peak;

reducing the correlation-time-frequency map to a two-dimensional time-correlation timeslice centered on a frequency of the valid global maximum correlation peak;

searching the two-dimensional time-correlation timeslice for a local maximum above the detection assurance threshold occurring earlier in time than the global maximum correlation peak; and performing a leading edge discovery procedure to find an earlier leading edge concealed within a correlation envelope of the two-dimensional time-correlation timeslice.

25. A WLS as recited in claim 24, wherein the processing includes correlation processing and filtering of the local and reference signals to produce a correlation correlation-time-frequency function comprising leading and trailing sidelobes, wherein said leading sidelobes are reduced in amplitude.

26. A WLS as recited in claim 25, wherein the filtering produces a reduction of at least eight Decibels (8 dB) in the amplitude of the leading sidelobes.

27. A WLS as recited in claim 26, wherein the filtering process comprises the use of a Finite Impulse Response (FIR) filtering process.

28. A WLS as recited in claim 27, wherein the FIR filtering process comprises an all-pass, phase shifting filtering process that produces a substantially flat frequency response.

29. A WLS as recited in claim 27, said method further comprising making a cross-correlation computation using a Fast Fourier Transform (FFT), wherein the FIR filtering process is performed by multiplying the product of reference and local signal FFTs by a complex frequency response of the FIR filtering process, and then performing an Inverse Fast Fourier Transform (IFFT) to obtain the cross-correlation function.

30. A WLS as recited in claim 25, said method further comprising determining limits for a constrained time-frequency correlation search.

31. A WLS as recited in claim 30, said method further comprising reporting the TDOA value of an earliest local maximum correlation peak after the leading edge discovery procedure fails to find an earlier leading edge.

32. A WLS as recited in claim 31, said method further comprising reporting the TDOA value calculated by a pre-defined time-of-arrival determination procedure (Tau) performed after the leading edge discovery procedure successfully finds an earlier leading edge.

33. A WLS as recited in claim 31, said method further comprising discovering a global maximum correlation peak; confining the search space to a selected frequency corresponding to the global maximum correlation peak; and then searching a timeslice corresponding to the selected frequency to identify an earlier, local maximum correlation peak.

34. A WLS as recited in claim 33, said method further comprising determining that the earlier, local maximum correlation peak is above the detection assurance threshold.

35. A WLS as recited in claim 34, comprising applying the leading edge discovery procedure to identify an earlier-arriving signal hidden in a correlation envelope created by the additive effects of multi-path reflections.

36. A WLS as recited in claim 34, wherein, in the leading edge discovery procedure, the timeslice centered on an earliest maximum correlation peak is divided into time bins in leading and trailing directions.

37. A WLS as recited in claim 36, wherein the leading edge discovery procedure comprises the creation of an additional threshold based on a correlation value of the earliest maximum correlation peak.

38. A WLS as recited in claim 37, wherein the leading edge discovery procedure includes the detection of a second correlation peak that occurs before the global maximum correlation peak and is a local maximum below the detection assurance threshold.

39. A WLS as recited in claim 38, wherein the second correlation peak is hidden as a ledge or ramp within a correlation envelope of an earliest maximum correlation peak.

40. A WLS as recited in claim 39, wherein the leading edge discovery procedure further comprises resampling the timeslice upon a failure to find an earlier leading edge and setting a plurality of correlation thresholds.

41. A WLS as recited in claim 40, wherein the earliest maximum correlation peak is set to a first value (B) and the thresholds are based on the value of the earliest maximum correlation peak and a value of a sample at a later interval.

42. A WLS as recited in claim 41, wherein said thresholds are determined in accordance with the following time-of-arrival determination procedure (Tau):

$W > 0.7 *$ correlation value at time $T=B+1$, $Y > 0.2 *$ earliest maximum correlation peak at time $T=B$, and $Z >$ detection assurance threshold or $0.01$;

wherein, starting from the earliest maximum correlation peak, the time-of-arrival determination procedure steps timewise, comparing earlier samples against the thresholds (W, Y, Z) and, once the correlation value of the sample drops below any of the thresholds, the procedure counts the samples from the earliest maximum correlation peak to the earliest sample above all thresholds; and then the sample number (m) is used to find the earliest time-of-arrival according to the following rule set:

if m=0, then the time of a previous earliest maximum correlation peak remains the time-of-arrival for the locally received signal;

for all values of m greater than zero, the following rule is used to establish the time-of-arrival: $Tau=\frac{1}{4}*(chip\ rate)-m/2*(chip\ rate)+(0.7-c)*w$, wherein m is the number of bins between an earliest valid bin and the bin of the maximum correlation peak; chip rate is determined based on a table defining chip rates for different spread spectrum technologies; c is the ratio of the correlation value of the main correlation peak to the correlation value one bin later than the main correlation peak bin; and w is an empirically-determined offset.

43. A WLS as recited in claim 42, wherein, once the time-of-arrival (Tau) is computed, Tau is subtracted from the time corresponding to the maximum correlation peak resulting in a new time-of-arrival that is used in a computation of the time-difference-of arrival.

44. A WLS as recited in claim 25, wherein the reference signal is obtained using a second LMU comprising a wide-band receiver configured to collect and digitize a code division multiple access (CDMA)-modulated signal of interest for a sample period, and digital signal processing software within the second LMU models a rake receiver and demodulates the signal of interest.

45. A WLS as recited in claim 44, said method further comprising sending the demodulated signal of interest from the second LMU to the first LMU, and re-modulating the demodulated signal of interest at the first LMU to obtain the reference signal.

46. A WLS as recited in claim 45, said method further comprising, at the first LMU, recording the received local signal; correlating the recorded signal with the reference signal shifted over time and frequency ranges to produce a correlation function; and applying an asymmetric, linear phase Finite Impulse Response (FIR) filter in a timewise axis to suppress leading sidelobes of the correlation function.

* * * * *